(12) United States Patent
Anderson (10) Patent No.: US 9,005,081 B2
(45) Date of Patent: Apr. 14, 2015

(54) SYSTEM AND METHOD FOR REDUCED TRACK SLIPPAGE (75) Inventor: Randall T. Anderson, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 521 days.

(21) Appl. No.: 13/249,268

(22) Filed: Sep. 30, 2011

(65) Prior Publication Data

US 2013/0085036 A1   Apr. 4, 2013

(51) Int. Cl.
B60W 10/06 (2006.01)
B60W 10/107 (2012.01)
B60W 10/11 (2012.01)
B60W 30/18 (2012.01)
B60W 30/188 (2012.01)
B60W 50/00 (2006.01)

(52) U.S. Cl.
CPC ............. B60W 10/06 (2013.01); B60W 10/107 (2013.01); B60W 10/11 (2013.01); B60W 30/18172 (2013.01); B60W 30/1882 (2013.01); B60W 2050/0026 (2013.01); B60W 2510/1005 (2013.01); B60W 2540/04 (2013.01); B60W 2710/0677 (2013.01); B60W 2710/1038 (2013.01); B60Y 2200/25 (2013.01)

(58) Field of Classification Search
None
See application file for complete search history.

(56) References Cited

U.S. PATENT DOCUMENTS

| | | |
|---|---|---|
| 5,219,411 A | 6/1993 | Yamamoto et al. |
| 5,287,279 A | 2/1994 | Anan |
| 5,287,280 A | 2/1994 | Yamamoto et al. |
| 5,535,830 A | 7/1996 | Matsushita et al. |
| 5,699,248 A | 12/1997 | Nakagami et al. |
| 6,398,692 B1 | 6/2002 | Isaac |
| 7,340,339 B1 | 3/2008 | Fabry et al. |

Primary Examiner — Erin D Bishop
(74) Attorney, Agent, or Firm — Leydig, Voit & Mayer, Ltd.

(57) ABSTRACT

An on-board system for providing traction control for a variable-load bearing vehicle having tracks subject to slippage is disclosed. The system includes a member(s) configured to be activated by an operator of the vehicle with an operator-to-vehicle interface or alternatively, automatic control without operator intervention, based only on measured actual vehicle tread speed, without obtaining actual vehicle speed. Member activation serves to control engine power level sufficient to reduce the slippage. Automatic control, after operator activation, is linked to at least one look-up table having predetermined power level values to provide the engine power level control, required to reduce the slippage.

10 Claims, 4 Drawing Sheets

SYSTEM AND METHOD FOR REDUCED TRACK SLIPPAGE

TECHNICAL FIELD

This application relates to the reduction of slippage in track type vehicles.

BACKGROUND

Track type tractors, with a blade attached to the front thereof (e.g., bull dozers), are used to cut, lift or move material out of the ground or structures and to push the material to a new location. The amount of material that can be cut or moved is partly dependent and determined by vehicle weight, blade design, track-tread design, and the environment (coefficient of traction for the soil). For a given vehicle design, the primary large determinative variable is the condition of the soil, whether: wet/moist/dry, loose/compact, sand/clay, etc. This variable and types of soil condition have a significant impact on the effective coefficient of traction (COT). The higher the COT the more load the vehicle can push because it is easier to maintain traction (track tread engagement with the soil) before the vehicle loses traction with a "spinning out". The term "track" as used herein includes tracks, treads and wheels on the vehicles subject to "slip" or loss of traction.

Prior art expedients, such as described in U.S. Pat. No. 7,340,339, involve local sensors or electronics which automatically limit fuel supply and/or limit torque, to, among other things, reduce stress in components to prevent component damage. None of these or other expedients of the prior art, describe devices or means, which enhance slippage control and smoothness of vehicle operation, without relying on actual vehicle speed measurement. In addition, the prior art has not disclosed or used expedients which permit the intervention of an operator to initiate or otherwise allow an operator, with microprocessor or electronic control to more closely enhance slippage control and smoothness of vehicle operation.

SUMMARY

Generally, the present disclosure relates to an on-board system for providing traction control for a variable-load bearing vehicle having treads subject to slippage on ground. The system comprises at least one member configured to be activated by an operator of the vehicle with an operator-to-vehicle interface and a controller operatively connected to the at least one member. The controller is configured to control engine power to a level sufficient to reduce the slippage based in part on transmission output speed and in response to activation of the at least one member.

Another embodiment is an on-board system for providing traction control for a variable-load bearing vehicle having treads subject to slippage. The system includes an automatic control which is continuously in an active mode and at least one member configured to measure the actual vehicle track speed, without obtaining actual vehicle speed, wherein the automatic control comprises at least one member which is configured to continuously and automatically control available maximum engine power level, based on the actual vehicle track speed, sufficient to reduce the slippage.

The present disclosure further includes a method for providing traction control for a variable-load bearing vehicle having treads subject to slippage. The method includes a step of providing one of: i. an activation interface between an operator of the vehicle and the engine and transmission operation, to thereby permit the operator, at the operator's discretion; and ii. a fully automatic control which is continuously in an active mode; to activate engine and transmission control for traction control and reduction of slippage. In another step, at least one on-board look-up table is integrated with the activation interface or the fully automatic control, as applicable, the look-up table being provided with predetermined power level values and configured to provide the engine power level control according to transmission output speed (tread speed) and, as applicable, operator input required to reduce the slippage. In another step, under conditions of said slippage, activation of slippage control is initiated by one of: operator sensing of slippage and initiating activation of the activation interface; and automatic control continuously in an active mode; wherein the look-up table provides an engine power level to control transmission output speed to a level appropriate to reduce the slippage.

The above and other features of the present disclosure will become more evident from the following description and drawings in which:

DETAILED DESCRIPTION

Generally, the present system and control method described herein are useful and used for a bulldozer, tractor or similar vehicle with load carrying or moving capability and which are susceptible to driving track slippage. The system and method are configured and adapted to control engine power when the combination of blade load and ground conditions warrant such control, as determined by an operator in one embodiment, or in a second embodiment is automatically operable and based on actual track speed measurement, but without obtaining actual vehicle speed. The system further comprises, in one operator activated embodiment, an operator activated interface between an operator and a vehicle, an actual track speed measurement (in different embodiments), and a software controlled engine power limiting element which, through existing microprocessor or similar electronics including electronic control modules (ECMs), smoothly, efficiently and reliably results in minimizing of track slippage while maintaining optimal vehicle usage.

Generally the system further comprises an on-board system for providing traction control for a variable-load bearing vehicle having treads, tracks or wheels subject to slippage.

The system, in one embodiment, comprises at least one member configured to measure the actual track speed, without necessity of obtaining actual vehicle speed, wherein at least one member serves to continuously and automatically control available maximum engine power level, sufficient to reduce the slippage. The system affects control of fuel directed to an engine of the vehicle as a function of desired transmission gear ratio (or other operator inputs), actual track speed, engine power limit, engine speed, and torque limit Engine low power level and a high engine power level are determined and the system uses the calculated engine power limit to determine a fuel limit corresponding to the actual engine speed and engine torque limit Simple mapping of the desired transmission gear ratio input from the operator to an engine power limit (lower power at lower gear ratios) is operable with the track slipping less at the lower gear ratio input because of the corresponding lower power. However, if the operator wants to move the vehicle faster, the natural response is to increase the gear ratio, which also increases the engine power. In preferred embodiment, the system is further configured with a momentary (e.g., spring loaded button) or an on/off toggle switch to reduce engine power to allow for a quick change in power if it is only needed for a brief time. Actual track speed measurement may be required for such on/off toggle switch operation. Alternatively, a decel/brake pedal is configured to reduce engine power to allow for a quick change in power, with actual track speed measurements not being required in this alternative arrangement.

In accordance with the present control system there may never be a need for any knowledge or determination of actual vehicle speed of the tractor vehicle (i.e., there is no requirement for external measurements such as radar, GPS, or laser system). Instead, engine power is directly and locally adjusted based on operator inputs, controls, and other measurements indicating actual track speed. The operator may be given the ability to choose when and with what input, to enable the traction control system, through some sort of input device (button, gear ratio input, decel pedal, etc.). Without operator input, the traction control and operation may be automatic and based on determination of actual track speed but without the need for obtaining actual vehicle speed.

The operator is accordingly provided with a hand or foot control to adjust an input (e.g., button, lever, pedal, etc.). The input adjustment is configured to activate the control system to then automatically modify engine power output according to pre-determined parameters or tables with which the vehicle is configured. Track slip can be reduced by reducing engine power when the combination of blade load and ground conditions call for such action, but engine power can be increased when conditions are favorable to utilize the increased power by carrying or spreading a load at higher speeds. The control system utilizes a continuously variable transmission gear ratio input to provide a low engine power level in low/medium gears and a higher engine power level in higher gears. As described, another embodiment of operator input control is one, which is integrated with the operative system of the tractor vehicle, such as a decel/brake pedal, which is configured to variably reduce engine power as the pedal is depressed.

The system alternatively comprises, in another embodiment, at least one member configured to be activated by an operator of the vehicle, with an operator-to-vehicle interface, wherein activation of the at least one member serves to continuously and automatically control available maximum engine power level, sufficient to reduce the slippage. The automatic control is linked to at least one look-up table having predetermined power level values to provide the engine power level control according to specific transmission output speed (tread speed) and operator input, to reduce the slippage.

The present system provides operative traction control, which may include operator interface for small track type tractors with Continuously Variable Transmission (CVT) but is not limited to such vehicle application. The system provides the traction control without using actual vehicle speed calculation (no actual vehicle speed sensors or GPS) and the prior art traction control, the system being based on calculating difference between actual vehicle speed and actual track speed (slippage).

In accordance with the present system, track slip is limited, with or without operator initiation, by temporarily reducing engine power, with reduced engine power resulting in less power to slip the track. Accordingly, the system provides the same vehicle force capability, but at a lower speed.

The system may be configured to reduce track or wheel slip by using actual track speed measurements without the need for an operator interface (i.e., automatic slippage control). The engine power level is determined through a lookup table with transmission output speed (track speed) as the input to the table. The values in the lookup table are chosen to provide a nearly constant track power to the ground from about 2 to 3.5 kph actual track speed (maintaining constant engine power output below about 2 kph), then a nearly constant track force to the ground from about 3.5 to 5 kph actual track speed (maintaining maximum engine power output above about 5 kph).

Though the specific operator controls used in the present system are not intended to limit the present disclosure, it is preferred that two types of operator controls are available for the "Traction Control." An embodiment of a first control is a momentary activated button on the transmission joystick (with an optional AUTO mode), which utilizes actual track speed values in the AUTO mode. Alternatively, a toggle switch may be utilized with on/off positions, which remain unchanged in the selected position.

In operation, pressing the button once (or toggling to an on position), while in Forward, reduces engine power to a level defined by a map as a function of transmission output speed. Pressing the button again (or shifting out of forward or toggling to an off position) returns engine power to normal output. Alternatively, restrictions limiting the operation to Forward may not be necessary or applied. This system and these methods are appropriate for these types of vehicles. It is understood however, that any number of operator inputs (dials, buttons, etc.) are capable of being used to adjust the engine power.

In effecting the reduction of engine power output with operator control activation, the calculated engine power limit is divided by the actual engine speed to obtain an engine torque limit, which is used to determine a fuel limit for the significantly reduced track slippage in track type tractors (dozers). Reduced track slip allows the operator to concentrate on making blade adjustments to gather a blade load instead of being overly concerned with excessive track slip. It also results in a smoother ride in the cab when the operator backs the vehicle in reverse over the same path (less slip produces less bumps in the path).

Various Operative Controls and Parameters are Defined and Described:

Button Input Operation:

The system can be operated manually or configured to automatically enable traction control once the transmission moves from neutral to forward. At any time the operator can use the button to enable or disable the traction control system as long as it is in forward. Once it is taken out of forward the traction control system is disabled. In any case, once the traction control system has been enabled the engine power level is determined through a lookup table with transmission motor speed (track speed) as the input to the table as previously described.

Decel Pedal Input:

An embodiment of a second operator control is a Decel (deceleration) Pedal which affects engine power. Pedal position dictates allowable engine power, in addition to desired engine speed and transmission gear ratio. The further the pedal is pushed, the more the allowable power is reduced. The Decel Pedal control provides better overall vehicle control and traction modulation and is not tied to a positive activation as with the button control and is always active. The button or toggle switch control is however easier to effectively utilize.

Figure 3:
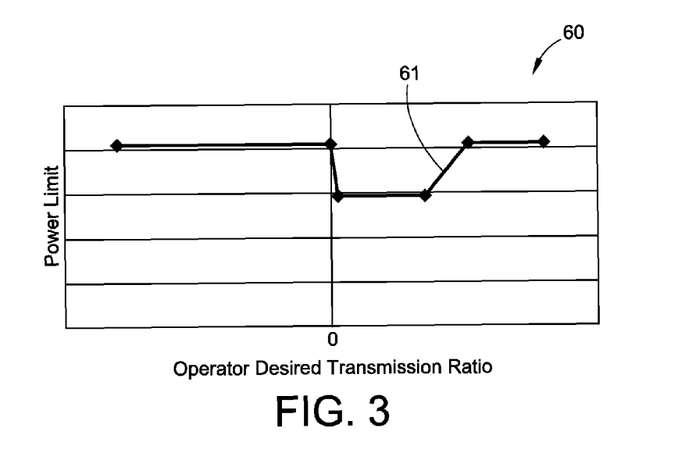
FIG. 3 is a graph, which represents the content of a table with engine power mapped against operator desired transmission ratio.

At any time (forward/reverse/neutral) the decel pedal can be depressed to reduce the engine power level. In most track type tractors, a decel pedal is used to provide a reduction in engine speed and transmission gear ratio. In the course of reducing engine speed the engine power also decreases, however it decreases in such a way that it isn't very beneficial for controlling track slip. The graph of FIG. 3 provides an illustration of the utility of the decel pedal input.

Gear Ratio Input:

A standard gear ratio input device can also be used to adjust the engine power level to achieve the desired level of track slip. Typically it would be configured such that for low/medium forward gear ratios it would provide a lower engine power level and then gradually increase to a higher engine power level for high forward gear ratios; in reverse it would provide a high power level output.

Rate Limits the Raw Power Limit Values:

Increasing and decreasing rate limits are used to obtain acceptable vehicle performance. However the transition times vary, in order to facilitate effectiveness of operation in effecting traction control, while maintaining smoothness of operation. Typically the decreasing rate limit is configured to be faster than the increasing rate limit in order to provide quick or instantaneous control and a smooth transition to greater power once traction control is no longer necessary. This ensures that track slip can be quickly reduced as necessary and also ensures that the vehicle does not increase track speed too quickly in order to maintain smooth operation of the vehicle. Rate limits are optionally applied for smoother operation Selecting the Final Engine Power Limit:

In the present examples and as described, the minimum of the button power or decel pedal power is selected. Nevertheless, any mechanism may be employed to choose the final power limit Calculation of the Engine Torque Limit and Fuel Limit:

Calculation of "engine power divided by engine speed" is performed in order to obtain the engine torque limit This engine torque limit is provided to the engine software where it is converted into a fuel limit.

Underspeed Control:

An underspeed control is typically used in the art for earth engaging vehicles such as track type tractors to prevent engine stall. These control systems serve to determine the appropriate CVT ratio to control the actual engine speed to a predetermined underspeed set point value. By reducing the CVT ratio, the torque load applied to the engine is reduced and excessive engine lagging or stall is avoided. Since, in the traction control system, the engine torque output has been reduced, it may lead to additional engine lugging or stall in the absence of an underspeed control. However, with an underspeed control the CVT ratio will be reduced to ensure the actual engine speed is controlled to the underspeed set point and in doing so the track speed has been reduced (less track slip).

Figure 1:
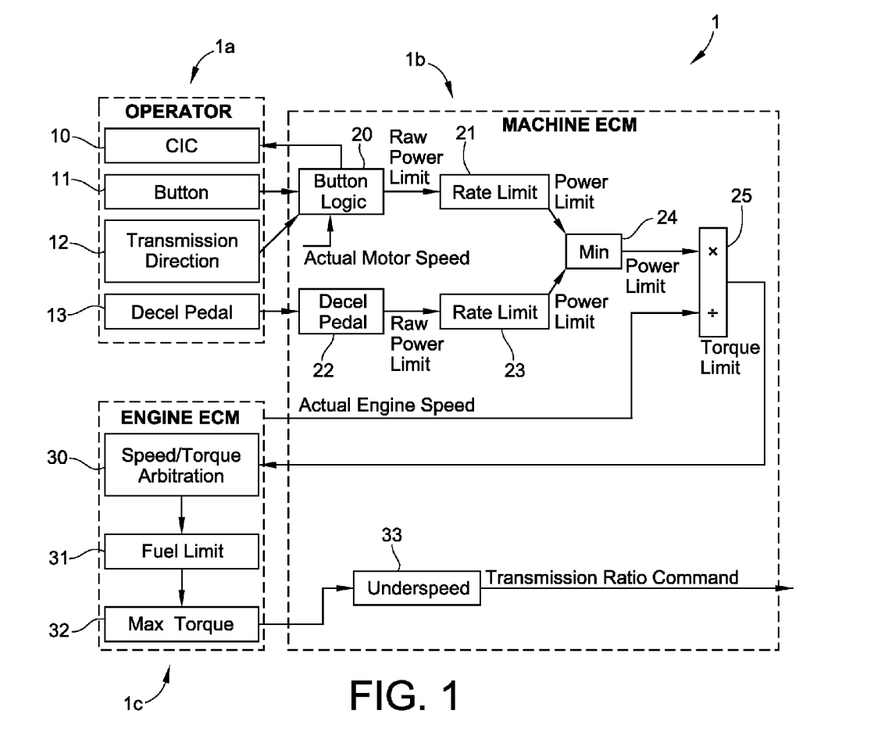
FIG. 1 is an operative flow chart schematically depicting vehicle components and interrelations therebetween, with an operator—engine interface and operator activated controls.

With respect to the drawings, In FIG. 1, the operative components of the system 1 in a vehicle, such as a bull dozer, are schematically depicted in three modules, an Operator module 1a which interfaces with the Machine ECM 1b which, in turn, is operable in controlling Engine ECM module 1c for the torque limit, used to provide the slippage control of the vehicle. The operator system components, in Operator module 1a, comprise the instrument cluster 10, which provides visual feedback of vehicle operation to the operator. Transitory button control 11 situated, for convenience on a transmission gearshift, provides the on/off toggling of the torque reduction and slippage control. The button operation is only effective with such control when the gear shift (not shown) and desired transmission direction 12 is in the forward direction.

The second, always-on, slippage control interface decel pedal 13 is continuously variable by variation in pedal position. The decel pedal 13 is operable in any gear or direction. The effect of the operator operation 1a controls 11 and 13 interface with the Machine ECM with a microprocessor control (not shown) to provide a programmed button logic 20 and decel pedal 22 variable control to each effect a raw power limit and rate limits 21 and 23. The respective power limits are combined to provide a minimum at input 24 and a combined power limit with operational control 25, which effects an appropriate multiplication and division, to provide a torque limit output (torque being power/speed) to Engine ECM 1c, with a microprocessor controlled operational speed/torque arbitration 30, fuel limit 31, and setting of a maximum torque 32, which is available for engine operation. The torque is provided to the CVT as an input to an underspeed control 33 and then with an output of a transmission ratio command with the CVT having a corrected ratio appropriate to the load. It is understood that either of the button and decel pedal controls are operable separately or alone, with defined parameters, in addition to the combination of functions as depicted.

Figure 2:
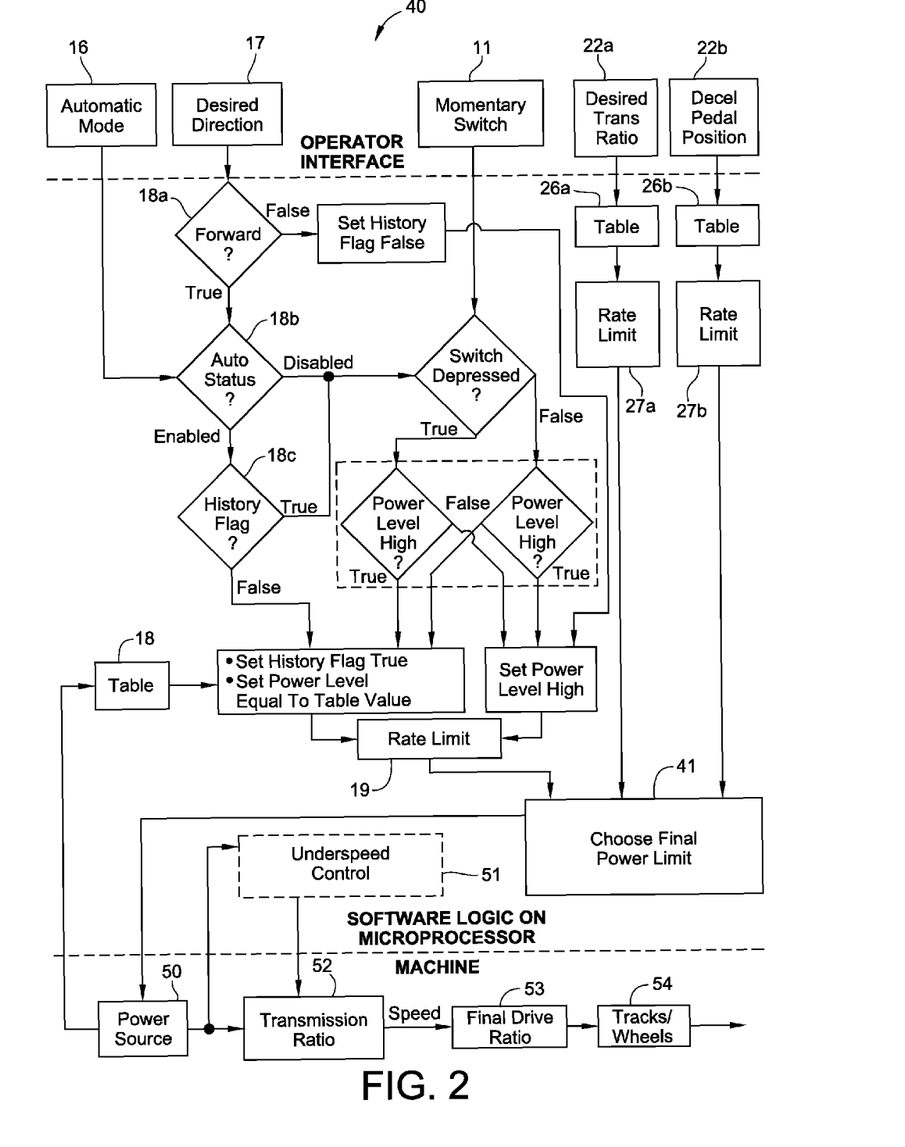
FIG. 2 is an overall decision flow chart and operation of the system with use of Automatic mode, "Button" control input, Operator selected Desired Transmission ratio and "Decel Pedal" position as operator input interfaces.

FIG. 2 is a flow chart 40 of the operational logic of the system with utilization of a button or momentary switch 11, with simple on/off control toggling. With the desired direction of the transmission gear 17 not being Forward at 18a, the history flag is set to false and the power level is set to high. With the desired direction of the transmission gear 17 being Forward at 18a, the operational logic then checks the automatic mode status at 18b. With automatic mode status at 18b being enabled and history flag at 18c being false, history flag is then reset to true and the power level is set as being equal to table value from table 18. With automatic mode status at 18b being disabled or history flag at 18c being true, the operational logic checks for momentary switch 11 activation. This table value power level then contributes to the chosen final limit 41 as will be described. The chosen power limit 41 is a functionally combined power level of all the operational sources and is equal to the power level of only a single source.

Figure 4:
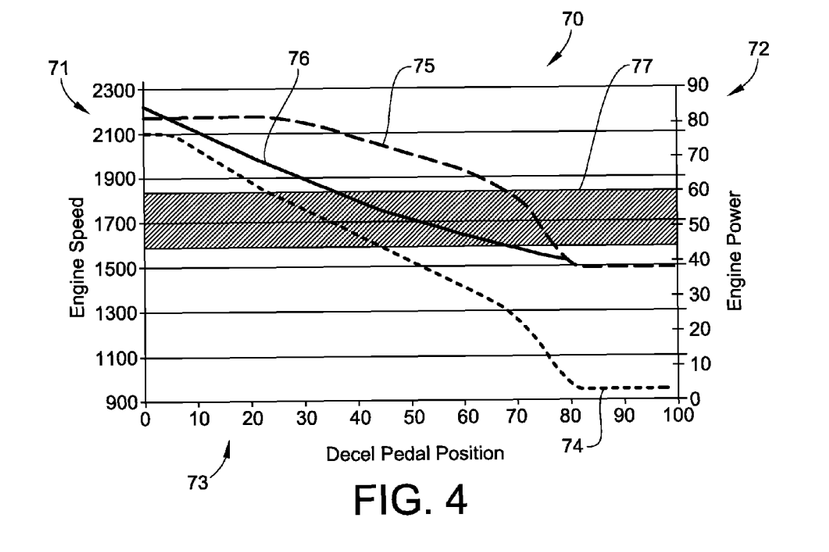
FIG. 4 is a graph, which represents the content of a table with engine speed and engine power mapped against decel pedal position.

When the momentary switch 11 is activated it toggles the engine power level between being set high or being equal to table value from Table 18, depending on which of the two had been used before the momentary switch 11 was activated (switches to the one which had not been previously used). Alternatively, if the switch 11 is an on/off toggle switch it always sets the power level being high when "Off" and always sets the power level being equal to table value from Table 18 when "On." Table 18 has transmission output speed or any measurement of wheel or track speed as an input, with Table 18 output being an engine power limit before the rate limit is applied. Table 18 is represented by the graph of FIG. 4. The active power level (being set high or being equal to table value from Table 18) is provided as an input to rate limit 19, which in turn contributes to the chosen final power limit 41.

As a separate optional component desired transmission ratio 22a is operator controlled to provide via an input of table 26a engine power limit to rate limit 27a which in turn is another component of the chosen final power limit 41. The decel pedal position (determined by the amount of pedal depression) 22b is associated with table 26b to provide another engine power limit value to rate limit component 27b for the final power limit 41 determination. Table 26a has an input of desired transmission ratios and table 26b has a different input of decel pedal position. Both tables 26a and 26b have outputs, of engine power limits for the particular inputs.

Power limit 41 chosen determination is supplied to a power source 50. Optional underspeed control 51, provides ratio command to transmission 52, through final drive ratio 53, which affects the speed of the tracks or wheels 54 of the vehicle. Without optional underspeed control 51, the power source 50 speed output would be reduced due to the reduced power output, which through the transmission 52 and final drive ratio 53 affects the speed of the tracks or wheels 54 of the vehicle (this is typical operation for torque converter transmission).

FIG. 3 is a graph 60, which represents the content of Table 26a, with engine power mapped against operator desired transmission ratio. In this exemplary embodiment the curve 61 engine power is maintained at a high level for reverse and neutral operator desired transmission ratios. For low to medium forward operator desired transmission ratios, the engine power is set to a lower power level and then transitions to a high power level for high forward operator desired transmission ratios.

FIG. 4 is a graph 70, which represents the content of Table 26b with engine speed 71 and engine power 72 mapped against decel pedal position 73. Desired engine speed 74 decreases with increased pedal depression and normal engine power curve 75 decreases with the reduction in engine speed (typical engine torque/speed relationship). The traction control engine power is represented by curve 76. Track slippage control in the shaded area 77 from about 45 to 60 in engine power is spread out over a relative large percentage of pedal depression of about 35 to 70 to provide greater control of track slippage.

Figure 5:
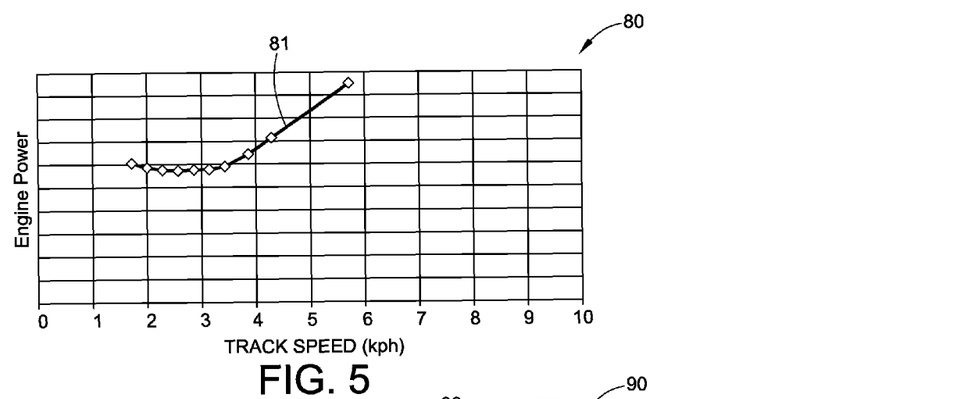
FIG. 5 is a graph which represents the content of a table with engine power mapped against actual transmission output speed (track or wheel speed)

FIG. 5 is a graph 80, which represents the content of Table 18 with engine power mapped against actual transmission output speed (track or wheel speed). In this exemplary embodiment the curve 81 engine power is determined such that the resulting track power and track force to the ground satisfy certain objectives as described in FIG. 6 and FIG. 7.

Figure 6:
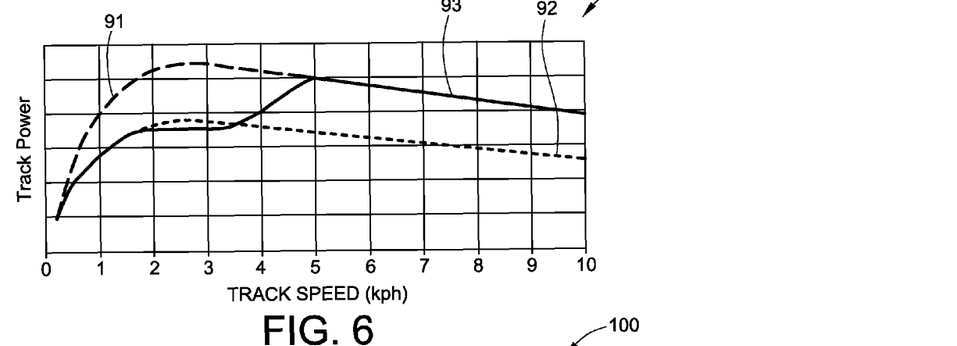
FIG. 6 is a graph with the track power to the ground mapped against actual track speed.

FIG. 6 is a graph 90 with the track power to the ground mapped against actual track speed. Curve 91 is the track power to the ground with the engine power level equal to the high power level. Curve 92 is the track power to the ground with the engine power level equal to the first point in Table 18. Curve 93 is the track power to the ground with engine high power level determined based on all points in Table 18. In this exemplary embodiment the curve 93 is approximately constant from approximately 1.8 kph to 3.5 kph and is achieved by the shape of curve 81. It is noted that the dip in curve 81 is used to remove the natural peak from curve 92 at about 2.5 kph to achieve an approximately constant portion of curve 93. The flat portion of the track power curve 93 allows for easy control of track slip by the operator through blade height adjustments.

Figure 7:
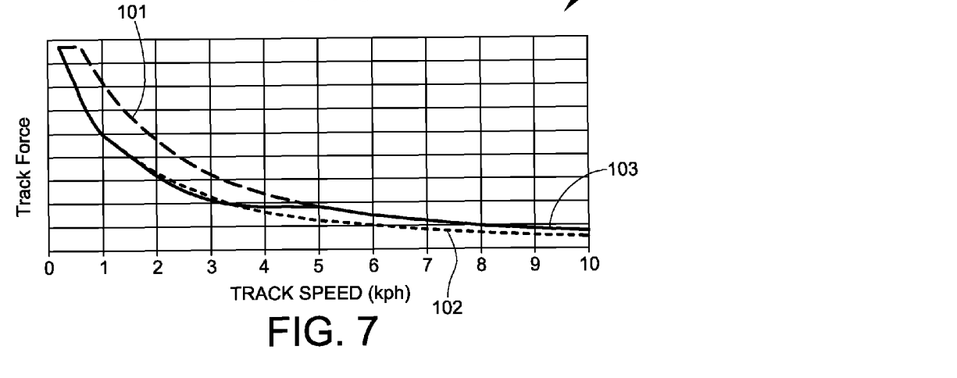
FIG. 7 is a graph with the track force to the ground mapped against actual track speed.

FIG. 7 is a graph 100 with the track force to the ground mapped against actual track speed. Curve 101 is the track force equivalent to the track power from curve 91. Curve 102 is the track force equivalent to the track power from curve 92. Curve 103 is the track force equivalent to the track power from curve 93. In this exemplary embodiment the curve 103 is approximately constant from approximately 3.5 kph to 5 kph and is achieved by the increasing slope of curve 81. The flat portion of the track force curve 103 allows for the machine speed to easily increase from 3.5 to 5 kph.

Industrial Applicability

The problem of spin out susceptibility and the effect of COT is most prevalent with smaller "dozers", although it can be an issue with any size dozer or similar vehicle. Furthermore, it is desirable to maximize the engine power of the vehicle to increase the speed at which it can move material when conditions are favorable. However, this has a negative impact on traction when trying to cut material out of the ground at slower vehicle speeds.

Expedients to solve this problem include an underspeed control, which changes the transmission gear ratio to maintain the engine speed at a desired value. The transmission gear ratio can change the overall vehicle speed from a high level to a low level as the vehicle encounters an external load with the blade. Operative success of an expedient such as the underspeed control is measured by how well it manages engine speed and how quickly and smoothly it changes vehicle speed.

Prior art expedients of traction control have been used on large dozers, with usually externally based sensing elements such as ground speed sensing radar. With knowledge of actual vehicle speed it is then possible to make adjustments on the vehicle to reduce the amount of track slip. Other sensing methods for determining actual vehicle speed include satellite GPS or a laser system. These systems of actual vehicle speed determination are however expensive and, at least, because of the non-proximity to the operating vehicle, they are susceptible to a degree of unreliability.

The disclosed on-board system for traction assist and method are thus seen to control engine power when the combination of blade load and ground conditions warrant such control, as determined by an operator or with actual track speed measurement without operator input. The on-board system uses an operator activated interface between an operator, actual track speed measurement, in an embodiment with automatic control, and a software controlled engine power limiting element which, through existing microprocessor or similar electronics including electronic control modules (ECMs), smoothly, efficiently and reliably results in minimizing of track slippage while maintaining optimal vehicle usage.

The operator activated system also uses at least one control member such as a manual switch or button preferably located on the gear shift or a control pedal such as a decal pedal. The control member is configured to be activated by an operator of the vehicle, with the operator-to-vehicle interface, wherein activation of the at least one member serves to continuously and automatically control available maximum engine power level sufficient to reduce the slippage.

The system, with automatic operation, further comprises at least one member configured to measure the actual track speed (without need to obtain actual vehicle speed) wherein one member serves to continuously and automatically control available maximum engine power level sufficient to reduce the slippage.

The automatic control is linked to at least one look-up table having predetermined power level values to provide the engine power level control according to specific transmission output speed (tread speed) and engine power to reduce the slippage. The button control member may be a momentary (e.g., spring loaded button) or an on/off toggle switch to reduce engine power to allow for a quick change in power if it is only needed for a brief time. Alternatively, a decel/brake pedal may be configured to reduce engine power to allow for a quick change in power or with a direct input control by an operator for a desired transmission ratio selection for reducing power level.

In operation, the activation interface between an operator of the vehicle and the engine and transmission operation permit the operator to activate engine and transmission control for traction control and reduction of slippage, at the discretion of the operator. At least one on-board look-up table is integrated with the activation interface and provided with predetermined power level values. The tables provide the engine power level control according to transmission output speed (track speed) and operator input such as decel pedal position, and desired transmission gear ratio to reduce slippage. On operator initiation of the activation of the activation interface, under conditions of slippage, with an activation element, such as a manual switch, the look-up table provides an engine power to a level appropriate to reduce the slippage.

The present system can effect control of fuel directed to an engine of the vehicle as a function of CVT gear ratio (or other operator inputs), actual track speed, engine power limit, engine speed, and torque limit Engine low power level and a high engine power level are determined and the system uses the calculated engine power limit to determine a fuel limit corresponding to the actual engine speed and engine torque limit.

Simple mapping of the desired transmission gear ratio input from the operator to an engine power limit (lower power at lower gear ratios) is operable with the track slipping less at the lower gear ratio input because of the corresponding lower power. However, if the operator wants to move the vehicle faster, the natural response is to increase the gear ratio, which also increases the engine power.

In accordance with the on-board system for traction assist of the present disclosure there may be no need for any knowledge or determination of actual vehicle speed of the tractor vehicle (i.e., there is no requirement for external measurements such as radar, GPS, or laser system). Instead, engine power is directly and locally adjusted based on operator inputs, controls, and other measurements indicating actual track speed. The operator is given the ability to choose when and with what input, to enable the traction control system, through some sort of input device (button, gear ratio input, decel pedal, etc.).

The operator is accordingly provided with a hand or foot control to adjust an input (e.g., button, lever, pedal, etc.). The input adjustment is configured to activate the control system to then automatically modify engine power output according to pre-determined parameters or tables with which the vehicle is configured. Track slip can be reduced by reducing engine power when the combination of blade load and ground conditions call for such action, but engine power can be increased when conditions are favorable to utilizing the increased power by carrying or spreading a load at higher speeds. The control system utilizes a continuously variable transmission gear ratio input to provide a low engine power level in low/medium gears and a higher engine power level in higher gears. As described, another embodiment of operator input control is one which is integrated with the operative system of the tractor vehicle such as a decel/brake pedal which is configured to variably reduce engine power as the pedal is depressed.

This system and these methods are appropriate for bulldozer, tractor or similar vehicle with load carrying or moving capability and which is susceptible to driving track slippage. It is understood that any number of operator inputs (dials, buttons, etc.) are capable of being used to adjust the engine power.

In effecting the reduction of engine power output with operator control activation, the calculated engine power limit is divided by the actual engine speed to obtain an engine torque limit, which is used to determine a fuel limit for the significantly reduced track slippage in track type tractors (dozers). Reduced track slip allows the operator to concentrate on making blade adjustments to gather a blade load instead of being overly concerned with excessive track slip. It also results in a smoother ride in the cab when the operator backs the vehicle in reverse over the same path (less slip produces less bumps in the path).

As embodiments of the present system are linked to an operator interface, four expert operators were used to evaluate the system operation in a small bulldozer with respect to parameters of transition smoothness and responsiveness as well as comparison of amount of track slip during system enabled conditions and system disabled conditions. In addition, the operators evaluated the effort required to gather a load with and without enabled traction assist. The average results of the evaluations (based on a 1-9 scale with 1 being poor performance and 9 being good performance) of transition smoothness and responsiveness and the comparative track slip and load gathering effort are contained in Table 1:

TABLE 1

| (1-9 SCALE) | |
|---|---|
| Smoothness & Responsiveness during transition when ENABLING traction assist | 6.75 |
| Smoothness & Responsiveness during transition when DISABLING traction assist | 8 |
| Amount of track slip during operation when traction assist is ENABLED (please comment if slip is too much or too little) | 7.25 |
| Amount of track slip during operation when traction assist is DISABLED (please comment if slip is too much or too little) | 4 |
| Effort required to gather a load when traction assist is ENABLED | 7.25 |
| Effort required to gather a load when traction assist is DISABLED | 4 |

It is understood that the above description, drawings and examples are representative of the present disclosure and that changes may be made to the various controls and operations and interrelations without departing from the scope of the present disclosure as defined in the following claims.

What is claimed is:

1. An on-board system for providing an engine control parameter value pertinent to implement traction control for a variable-load bearing vehicle having an engine and treads, the threads being powered by output from the engine and subject to slipping on a traveled surface, the system comprising:
at least one member configured to be activated by an operator of the vehicle with an operator-to-vehicle interface; and
a controller operatively connected to the at least one member, the controller configured to:
determine in response to activation of the at least one member, an engine power limit value based upon a provided transmission output speed value (speed value), and wherein the engine power limit value is specified, based upon the speed value, such that:

for a first low range of the speed value, beginning at a first non-zero speed and ending at a second non-zero speed, the engine power limit value decreases as the speed value increases, for a second low range of the speed value, beginning at the second non-zero speed and ending at a third non-zero speed, the engine power limit value increases, at a first rate of increase, as the speed value increases, and wherein the specified engine power limit values of the first low range and the second low range have an effect of maintaining an approximately same level of output track power over the first low range and the second low range, render an engine torque limit based upon the engine power limit value, and issue an engine torque control parameter value, based upon the engine torque limit, to an engine controller for controlling the engine.

2. The on-board system of claim 1, wherein the transmission output speed value is a track speed of the vehicle, and wherein the on-board system is configured to reduce the engine power limit value to reduce the slipping of the treads.

3. The on-board system of claim 1, wherein the specified engine power limit values are based at least in part on a set of engine power limit values stored in a look-up table.

4. The on-board system of claim 3, wherein the look-up table comprises a first set of engine power limit values mapped against actual transmission output speed.

5. The on-board system of claim 3, wherein the member comprises an operator operable deceleration pedal which is configured to provide the activation, with changing of position of the pedal, and wherein the lookup table comprises a second set of engine power limit values mapped against a degree of pedal movement.

6. The on-board system of claim 5, wherein the look-up table comprises a set of desired engine speed values mapped against the degree of pedal movement, wherein the degree of pedal movement corresponds to a deceleration pedal position, and wherein values of the set of desired engine speed values decrease with pedal movement corresponding to increased pedal depression of the decal pedal.

7. The on-board system of claim 1, wherein the member comprises an operator operable momentary or toggle on/off switch, and wherein the member is configured to activate only if the vehicle transmission is in a forward gear and wherein the switch is deactivated, after activation, by performing one of the group of actions consisting of:

changing gear from the forward gear,
momentary switching, and
toggling to an off position.

8. The on-board system of claim 1 wherein the engine power limit value is specified, based upon the speed value, such that:

for a high range of the speed value, beginning at the third non-zero speed, the power limit value increases, at a second rate of increase that exceeds the first rate of increase, as the speed value increases.

9. The on-board system of claim 1, wherein the controller is further configured to render a further engine power limit based upon an operator desired transmission ratio, and wherein values of the further engine power limit comprise:

high engine power limit values when the operator desired transmission ratio is for reverse and neutral desired transmission ratios, low engine power limit values when the operator desired transmission ratio is for a range of low to medium forward desired transmission ratios, high engine power limit values when the operator desired transmission ratios is for a highest range of forward desired transmission ratios; and a set of values transitioning between the low to the high engine power limit values when the operator desired transmission ratio is in a range between a highest ratio of the range of low to medium forward ratios and a lowest ratio of the highest range of forward desired transmission ratios.

10. The on-board system of claim 1, further comprising an underspeed control that provides a ratio command for a transmission ratio, in combination with the engine control to ensure sufficient engine speed during operation of the controller to limit engine power to reduce the slippage.

* * * * *